Feb. 13, 1973 L. W. PARKER 3,716,793

AMPLITUDE MODULATION DETECTOR FOR RADIO RECEIVERS

Filed Dec. 7, 1971 3 Sheets-Sheet 1

INVENTOR

Louis W. Parker

BY

ATTORNEY

AMPLITUDE MODULATION DETECTOR FOR RADIO RECEIVERS

Filed Dec. 7, 1971 3 Sheets-Sheet 2

INVENTOR
Louis W. Parker
BY
ATTORNEY

Feb. 13, 1973 L. W. PARKER 3,716,793

AMPLITUDE MODULATION DETECTOR FOR RADIO RECEIVERS

Filed Dec. 7, 1971 3 Sheets-Sheet 3

INVENTOR

Louis W. Parker

BY

ATTORNEY

United States Patent Office 3,716,793
Patented Feb. 13, 1973

3,716,793
AMPLITUDE MODULATION DETECTOR FOR RADIO RECEIVERS

Louis W. Parker, 2408 Sunrise Key Blvd., Fort Lauderdale, Fla. 33304

Filed Dec. 7, 1971, Ser. No. 205,532
Int. Cl. H04b 1/16
U.S. Cl. 325—487 15 Claims

ABSTRACT OF THE DISCLOSURE

The IF carrier in a radio receiver is used to control the deflection circuits of a cathode ray tube to cause a circular sweep of the tube beam. Light from the resultant circular oscillogram is projected onto two ring-shaped concentric photocells in such fashion that the light falls partially between and partially on said photocells with each photocell receiving one polarity of the AF wave. The sizes of the photocell surfaces are selected so as to extend only to the peak amplitude of modulation on both the positive and negative halves of the AF cycle, to effect clipping of any noise riding on the oscillogram. The combined outputs of the photocells provide the desired demodulated AF signal.

The brilliance of the oscillogram is maintained by a separate photocell controlled circuit. Variations in the basic circuit include the use of ring-shaped secondary emission plates within the cathode ray tube, instead of ring-shaped photocells.

BACKGROUND OF THE INVENTION

The present invention is concerned with a system adapted to increase the signal to noise ratio in radio receivers, employed for the reception of amplitude modulated radio signals. The invention is based on the phenomenon that radio frequency waves differ from noise signals by their accurate repeatability over a large number of cycles, whereas noise is not accurately repeatable over a length of time. If the RF waves and noise are accumulated on an appropriate recording means, e.g. the screen of a cathode ray tube, the portions that always fall on or near the same spot will induce a brighter image than the random waves or pulses. This permits a partial separation of the RF waves and noise. The difference between signal and noise can be enhanced by the use of a very short persistence screen, and utilization of a signal frequency as high as practicable. Short persistence quickly erases a random pulse, while high frequency of repetitions replaces the image falling always on the same spot before it has time to be erased. In one form of the present invention, the oscillogram so obtained is projected onto photocells which then supply a demodulated AF signal.

A variety of suggestions have been made heretofore which include the utilization of cathode ray tube devices, for various purposes, in radio receivers. Some of these prior suggestions are embodied in Hansel et al., U.S. Pats. No. 1,938,331 and 2,202,376, Wertz U.S. Pat. No. 2,430,038, Labin et al. U.S. Pat. No. 2,438,928, Sziklai U.S. Pat. No. 2,470,731, and Horgan U.S. Pat. No. 2,903,-582. The Horgan patent, for example, contemplates the provision of a detector circuit employing a cathode ray tube, with a modulated high frequency input signal being impressed on the beam deflection means of that tube to cause the spot of light on the face of the tube to describe a straight line path relative to a centralized position on the tube; and the displacement of the beam, which is proportional to the amplitude of the input signal, is used to control a photocell which in turn supplies the demodulated output signal desired. In providing that demodulated output signal, however, Horgan ignores the effect of noise which may be present in the received signal, and makes no provision for eliminating such noise or reducing its effects.

Other references, for example, the Wertz patent identified above, do seek to reduce the effect of noise. Wertz attempts to do so, in a radar system adapted to store trains of pulses, by employing a dual cathode ray tube arrangement wherein a recording tube section and a reproducing tube section (each provided with its own beam producing means) are separated from one another by a target-bearing partition. The beams in both sections are scanned, in a circular path of fixed diameter, over opposing ends of the targets respectively. Received echos and noise are utilized to modulate the beam intensity in the recording tube section of the dual CRT tube arrangement thereby to control the charge which accumulates on the targets; and the accumulated charges are in turn picked up by the scanned beam in the reproducing tube section to produce an output signal wherein the radar echo pulses are accentuated with respect to any noise variations which may also be received. It has been found, however, that the Wertz radar-type apparatus does not provide any improvement in signal to noise ratio in an AM receiver, possibly because the types of signals which must be interpreted in such a receiver are markedly different from those which are encountered in radar applications.

The present invention, recognizing this nature and the defects of the prior art, is concerned with a highly improved amplitude modulation detector of the cathode ray tube type adapted for use in conjunction with amplitude modulation radio receivers, e.g., of the types employed in commercial or military applications, and providing a significant increase in the signal to noise ratio achieved in such radio receivers.

SUMMARY OF THE INVENTION

In accordance with the present invention, a cathode ray oscilloscope tube has its deflection circuits driven by the intermediate frequency output of a conventional AM receiver to produce a circle shaped oscillogram corresponding to said intermediate frequency. In one form of the invention, the oscillogram is optically projected onto two ring-shaped concentric photocells which are spaced from one another by a distance somewhat narrower than the width of the circular oscillogram so that said oscillogram falls partially between said photocells and partially on them when the oscillogram is created by an unmodulated IF carrier. If the diameter of the oscillogram varies, due to amplitude modulation of the received signal, more light from the oscillogram falls on one or the other of said cells. The cells are connected to one another in opposed polarity, to produce a composite output corresponding to the algebraic sum of the two voltages. This composite signal varies according to the size of the illuminated area and the intensity of the illumination on the cells; and said combined output voltage or composite signal, from said photocells, acts as the demodulated audio frequency signal.

The two photocells receive, respectively, opposite polarities of the AF wave; and their sizes are selected so as to extend only to the peak amplitude of modulation on both the positive and negative halves of the AF cycle. The photocells thus act as noise limiters which operate to clip any noise impulses riding on the modulated signal above the known peak amplitude of modulation. Any noise signals which are impressed directly on the cells appear in both the positive and negative directions on the incoming signal; and the outputs of the two cells accordingly tend to balance one another as to such noise impulses to cause at least partial cancellation thereof.

A photocell controlled element is preferably provided to maintain substantially steady brilliance of the oscillogram. In addition, the output of a local oscillator is added to the signal in order to reduce modulation, thereby to prevent the circular oscillogram from momentarily becoming a spot in the middle of the screen. The output of the photocells may also be employed to vary the gain of the amplifier which supplies power to the circuit creating the oscillogram, and does this in a negative feedback fashion acting to reduce the variation in size of the oscillogram. The output of the photocells contain the demodulated audio frequency signals.

In alternative embodiments of the invention, ring-shape secondary emission plates are mounted within the cathode ray tube, in place of ring-shape photocells mounted outside the tube, to perform the various functions described in the fashions also described. In accordance with further modifications, a plurality of photocells or secondary emission plates, having a number larger than two, can be employed with their outputs being combined to produce a demodulated output signal. Moreover, the photocells or secondary emission plates employed in the various embodiments may extend over only a segment of the circle, rather than a complete circle (each of these forms nevertheless being generically termed "ring-shaped" hereinafter, and in the appended claims).

DESCRIPTION OF THE PREFERRED EMBODIMENTS

Figures 1, 3, 3A:
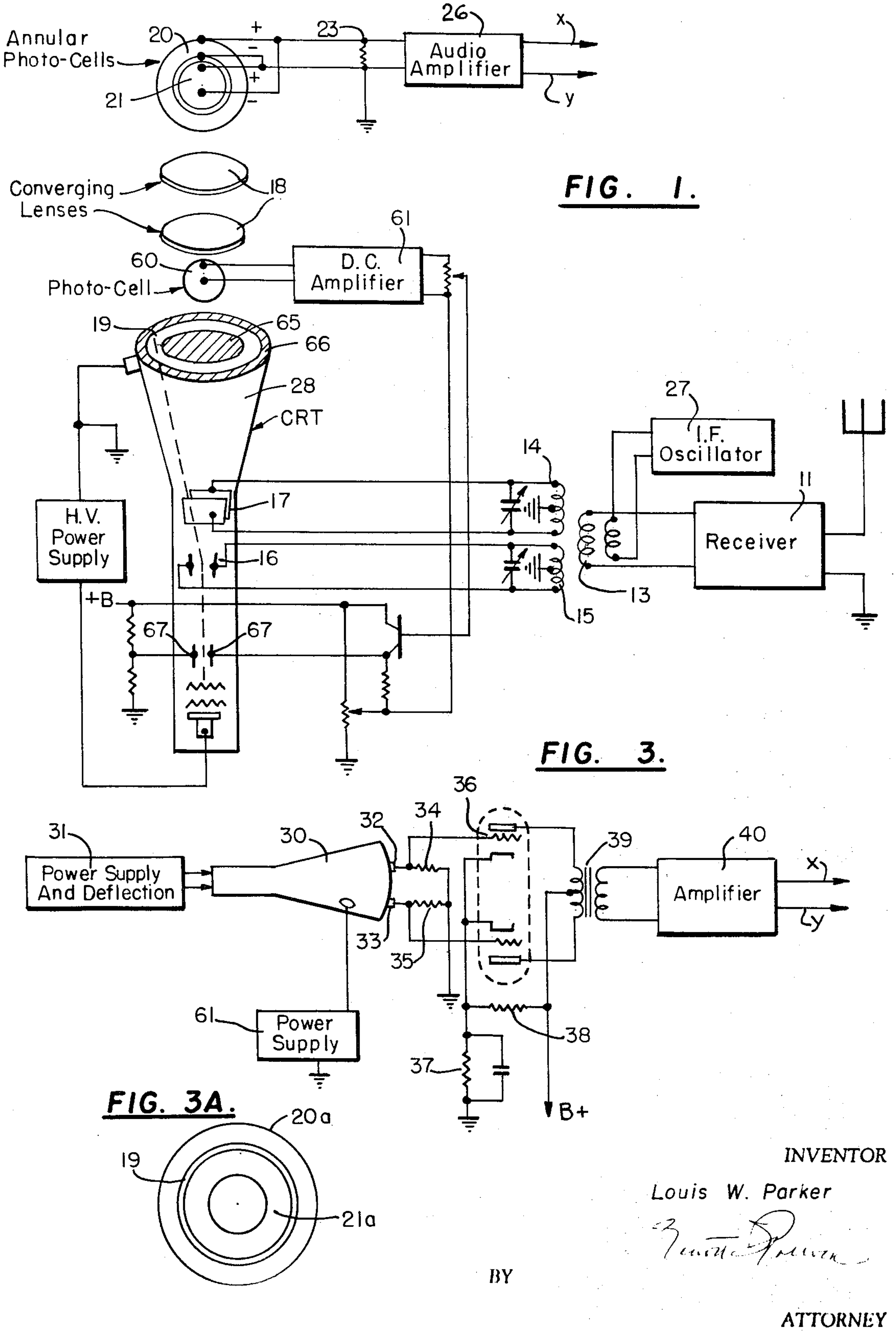
FIG. 1 is a schematic diagram of a cathode ray tube/photocell type amplitude modulation detector constructed in accordance with one embodiment of the present invention.
FIGS. 3 and 3A represent a further embodiment of the present invention employing secondary emission plates instead of photocells.

The operational fundamentals of systems constructed in accordance with the present invention are illustrated in FIG. 1. Incoming radio signals, which may include noise, are applied from an antenna to the input of an amplitude modulation receiver 11 of the superheterodyne type. The intermediate frequency output of receiver 11 is fed to a coil 13 comprising the primary coil of a tuned transformer. Secondary coils 14 and 15 of said transformer are tuned above and below the IF frequency by an appropriate amount operating to reduce their output voltage to approximately 71% of the voltage at resonance. This creates a 90° phase difference between the two outputs; and these differently phased signals are applied to pairs of deflection plates 16 and 17 in a cathode ray tube oscilloscope 28 to produce a circle shaped oscillogram 19 on the face of tube 28. The diameter of the circle constituting oscillogram 19 represents the amplitude of the IF signal. If that IF signal should be amplitude modulated, the diameter of the circle will vary.

Light from the oscillogram 19 is optically projected, by an optical system 18, so as to fall between two circularly shaped photocells 20 and 21 (all photocells are shown turned away by 90° from the CR tube 28 to facilitate understanding the principles involved). The space between photocells 20 and 21 is somewhat narrower than the width of the circular oscillogram, and, as a result, the oscillogram falls partly between the cells 20 and 21 and partly upon them when the oscillogram is created by an unmodulated IF carrier. On the other hand, if the diameter of the oscillogram should vary, due to amplitude modulation of the received signal, light from the oscillogram will fall on either one or the other of the two cells 20 and 21.

Photocells 20 and 21 are of the photo-voltaic type, and generate a D.C. potential when illuminated (of course, other types of photocells may also be used). The outer cell 20 is connected across a resistor at point 23 and, similarly, the inner cell 21 is also connected across said resistor. The connections take the form illustrated in FIG. 1 and are such that, when outer cell 20 generates more DC potential than inner cell 21, a positive potential appears at their combined output at point 23, with the polarity reversing when the inner cell 21 receives more light. The amplitude of the combined potential varies, of course, according to the size of the illuminated area and the intensity of the light. The combined output voltage of photocells 20 and 21 represent the demodulated audio frequency signal, which is fed to AF amplifier 26 and is available at outputs $x$ and $y$.

If both of photocells 20 and 21 are equally illuminated, their outputs are equal and no voltage appears between point 23 and ground. Inasmuch as noise signals which may be impressed on the IF carrier appear in both positive and negative directions, the arrangement illustrated in FIG. 1 tends to balance out such noise signals. In addition, the photocells can receive signals of only limited amplitude, depending on the dimensions chosen for the photocells. The widths of cells 20 and 21, in radial directions relative to oscillogram 19, are preselected so that the cells extend only to those locations corresponding to the positions taken by oscillogram 19 when the IF carrier is modulated to a predetermined peak amplitude on both the positive and negative halves of the audio frequency cycle. This causes the photocells to act also as noise limiters, operating to clip any noise signals riding on the oscillogram and extending beyond said peak amplitude of modulation. These considerations tend to assure, therefore, that noise is significantly reduced in the demodulated audio frequency signal.

Since the actual diameter of the oscillogram 19 varies with amplitude modulation of the received signal, it may be possible that the oscillogram could contract to a point in the center of the CR tube screen upon occurrence of very high modulation peaks. To avoid this, it is desirable to reduce the percentage of modulation on the signal; and this can be effected by adding the output from a local oscillator 27 to the IF carrier. Oscillator 27 must be well in synchrony and in phase with the incoming signal. There are known methods for accomplishing this synchronizing, and therefore no detailed description will be given here.

It should further be noted that, in forming the oscillogram 19, it is preferable that the electron beam spot not be focused very sharply. If the spot forming the oscillogram is somewhat de-focused, it causes a gradual increase in brilliance as the spot moves on to the photocell, thereby creating less distortion of the AF wave. In this respect, the present invention is concerned with a type of demodulator which is primarily intended for voice reproduction when excessive noises are present, and distortion of audio quality is less important than understandability of speech.

If the signals picked up by receiver 11 contain a large amount of noise, the apparent brilliance of the oscillogram 19 will vary. This is due to the fact that noise signals will deflect the electron beam radially, and consequently away from the circular path of the oscillogram, off the photocells. Inasmuch as the photocells 20 and 21 produce an output which is dependent not only on the position of the oscillogram impinging on them, but also on the brilliance of the oscillogram, such a variation in brilliance caused by noise will tend to vary the output of the photocells in a manner corresponding roughly to the noise.

To overcome this undesirable effect, a further photocell 60 is placed in front of the CR tube screen at a distance sufficiently far away from the screen so as not to be affected to any significant extent by variations in diameter of the oscillogram. Photocell 60 monitors the brilliance of the oscillogram 19 and supplies, via a DC amplifier 61, a control potential to one of the elements 67 in CR tube 28. Elements 67 correspond to those sometimes referred to as "unblanking" plates, and serve to deflect the beam more or less as desired thereby to permit all or only a portion of the beam to function in customary fashion in the remainder of the CR tube. The control potential applied to element 67 is of such polarity as to oppose variations in brilliance of the oscillogram; and, by this arrangement, variations in brilliance of the oscillogram 19 can be decreased to an insignificant value. Masks 65 and 66 are preferably placed on the screen of the CR tube 28 to prevent light from reaching photocell 60 from areas outside the maximum excursion of oscillogram 19.

While the arrangement shown in FIG. 1 contemplates using the extra deflection plates, or unblanking plates, in conjunction with photocell 60 and amplifier 61, to reduce variations in brilliance, it should be understood that other elements in the tube 28 could be similarly employed. Alternative arrangements will readily suggest themselves to those skilled in the art.

Figures 2, 4, 6:
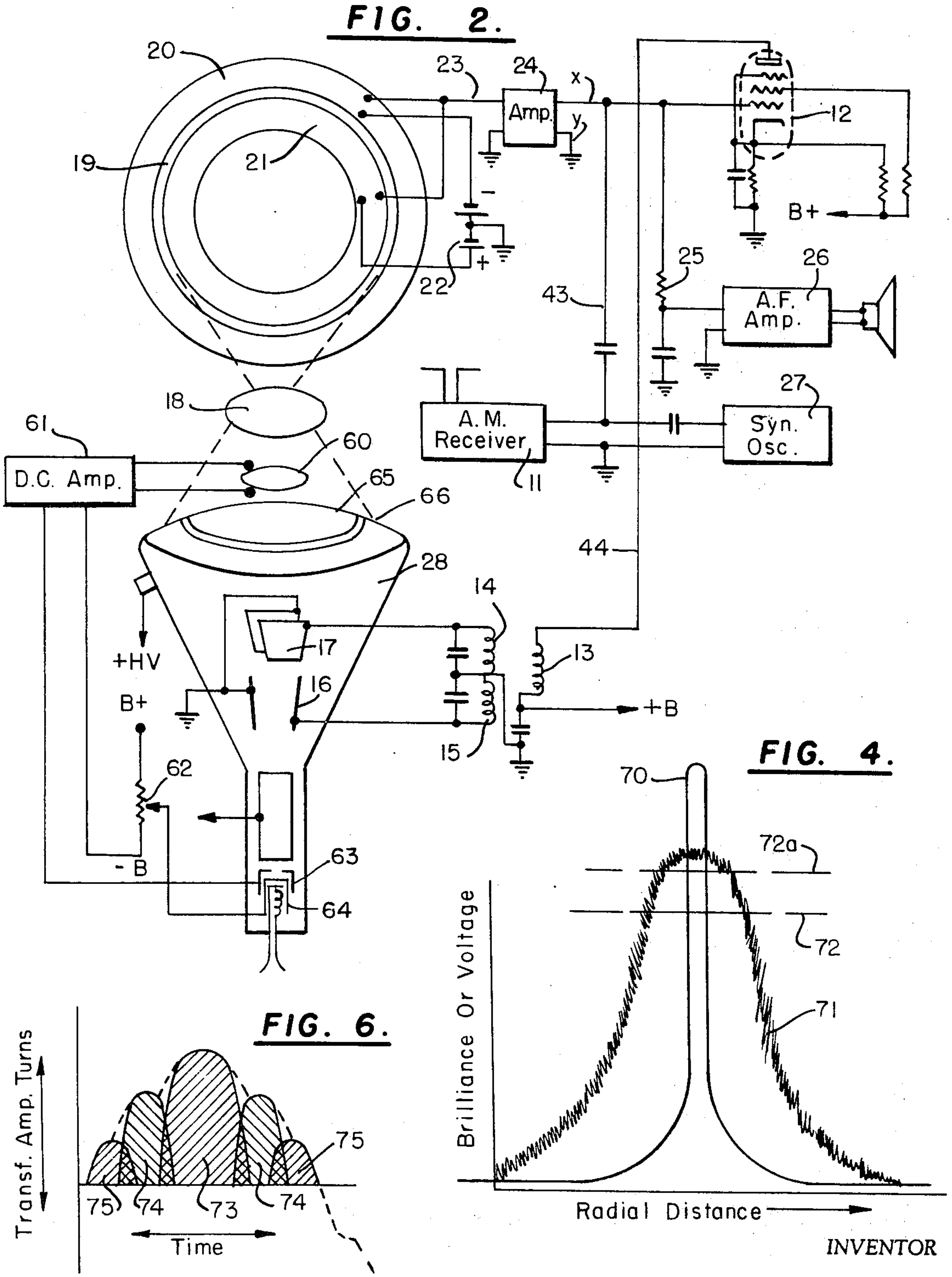
FIG. 2 is an alternative embodiment of the circuit shown in FIG. 1.
FIG. 4 is a Gaussian distribution curve illustrating certain aspects of the present invention.
FIG. 6 is a graphical diagram illustrating the approximate output produced by the embodiment of FIG. 5.

A different embodiment of the invention is illustrated in FIG. 2, and like numerals have been employed for parts already described in reference to FIG. 1. In the FIG. 2 arrangement, cathode ray tube 28 is operated in a fashion entirely similar to that shown in FIG. 1 except that the space for the oscillogram 19, between masks 65 and 66, is left smaller than that employed in FIG. 1. The photocells 20 and 21 shown in FIG. 2 are, moreover, of the type that vary their resistance upon illumination, and an electrical potential is supplied to said photocells by batteries 22 (or by any appropriate alternative power supply). It should be understood, however, that other types of photocells may be used. If both of photocells 20 and 21 are illuminated equally, their resistances are equal and no voltage will appear between point 23 and ground. On the other hand, if the outer ring-shaped cell 20 is illuminated more than the inner ring-shaped cell 21, a negative potential will appear between point 23 and ground; and this polarity reverses when the inner cell 21 is illuminated more than the outer cell 20.

Any voltage which appears between point 23 and ground is applied through an amplifier 24 to a variable gain amplifier tube 12. Tube 12 amplifies the IF signal supplied to it by AM receiver 11 through line 43. The amplitude control of the IF signal is done at AF rate. If the signal amplitude increases, the gain of tube 12 is lowered. This causes the signal, applied via line 44 and coils 13, 14, 15 to deflection plates 16, 17, to reduce the diameter of the oscillogram 19 so as to cause said oscillogram to fall more nearly within the region of the two photocells 20, 21. Complete compensation of the increase in this diameter is not possible since this would result in the loss of the control signal from the photocells. However, partial compensation is all that is needed since such partial compensation still supplies enough demodulated signal from the grid of the tube 12, through RF filter 25, to operate AF amplifier 26.

Photocell 60 has the same function as in FIG. 1. However the control of the electron beam is done by element 63 in CR tube 28. This element 63 reduces the number of electrons in the beam when negative potential is applied to it from amplifier 61. Control 62 sets up the proper operating level for control element 63.

The advantage of the embodiment shown in FIG. 2, over that already described in reference to FIG. 1, is that the width of photocells 20 and 21 can be reduced. Provision of smaller width photocells shuts off more of the unwanted signals that appear on top of the circular oscillogram. In addition, this form of the invention compensates partially for a fading signal at the antenna of the receiver 11.

In each of the FIG. 1 and FIG. 2 embodiments (and in the other photocell embodiments to be described hereinafter) it is desirable to use a short persistence screen in the CR tube, since this brings about a greater differentiation between a desired signal and noise. For example, if one employs a fast screen that reduces its brightness to 90% in one-half microsecond, such a screen will not have a significant effect on a spot which is repeated 2 million times per second. However, this same screen will reduce a random noise image to something in the order of one percent of its original value in a 50 microsecond time period; and, for all practical purposes, this means that a noise signal is completely extinguished before its effect can be noticed.

An alternative way of obtaining results similar to those achieved by short persistence screens, is to eliminate the described photocells, and, instead, to place two metal plates, having the same ring-shape as the photocells, inside the cathode ray tube close to the screen. The plates should comprise metallic materials capable of emitting secondary electrons when an electron beam impinges on them; and such plates accordingly act in a fashion similar to the photocells already described.

An alternative construction of this general type is shown in FIGS. 3 and 3A. In this embodiment of the invention, the cathode ray tube 30 is associated with a power supply and deflection equipment 31, and is operated in a fashion similar to tube 28 of FIG. 1. Connections 32 and 33 pass through the face of the tube 30, and hold, at a position inside of the tube envelope, two metal plates **20*a* and 21*a* (see FIG. 3A) having the same shape as photocells 20 and 21 already described. When plates 20*a* and 21*a* are bombarded by the circular oscillogram 19, they emit secondary electrons and create a current flow through resistors 34 and 35. Power supply 61 supplies this current flow, as conventional in monoscope tubes. A double triode 36, properly biased by arrangement of resistors 37 and 38, amplifies and combines the two output signals from tube 30 in the proper phase in the transformer 39. This transformer feeds amplifier 40 which functions similarly to amplifier 26** to provide an output at $x$ and $y$.

To simplify the constructions employed, and also to make the adjustment of the oscillogram less critical, ring-shaped segments of the circular plates or photocells 20–21 can be used in place of the complete annular elements thus far described. Such use of segmental ring-shaped plates or photocells enables some noise signals to ride through. Most noise signals result from the shock excitation of some resonant media; and, therefore, they are continuous waves with various degrees of decrement. If both polarities of such continuous waves are presented to the secondary emission plates or photocells, they are at least partially cancelled (as has already been described). When only segmental plates are employed, which are cut off at some arbitrary point, the completeness of noise cancellation is reduced. Nevertheless, the use of segmental plates or photocells in the embodiments already described does achieve a moderate improvement in the signal to noise ratio, and such modified arrangements can therefore be employed in those environments where such a moderate improvement is all that is required.

Figure 5:
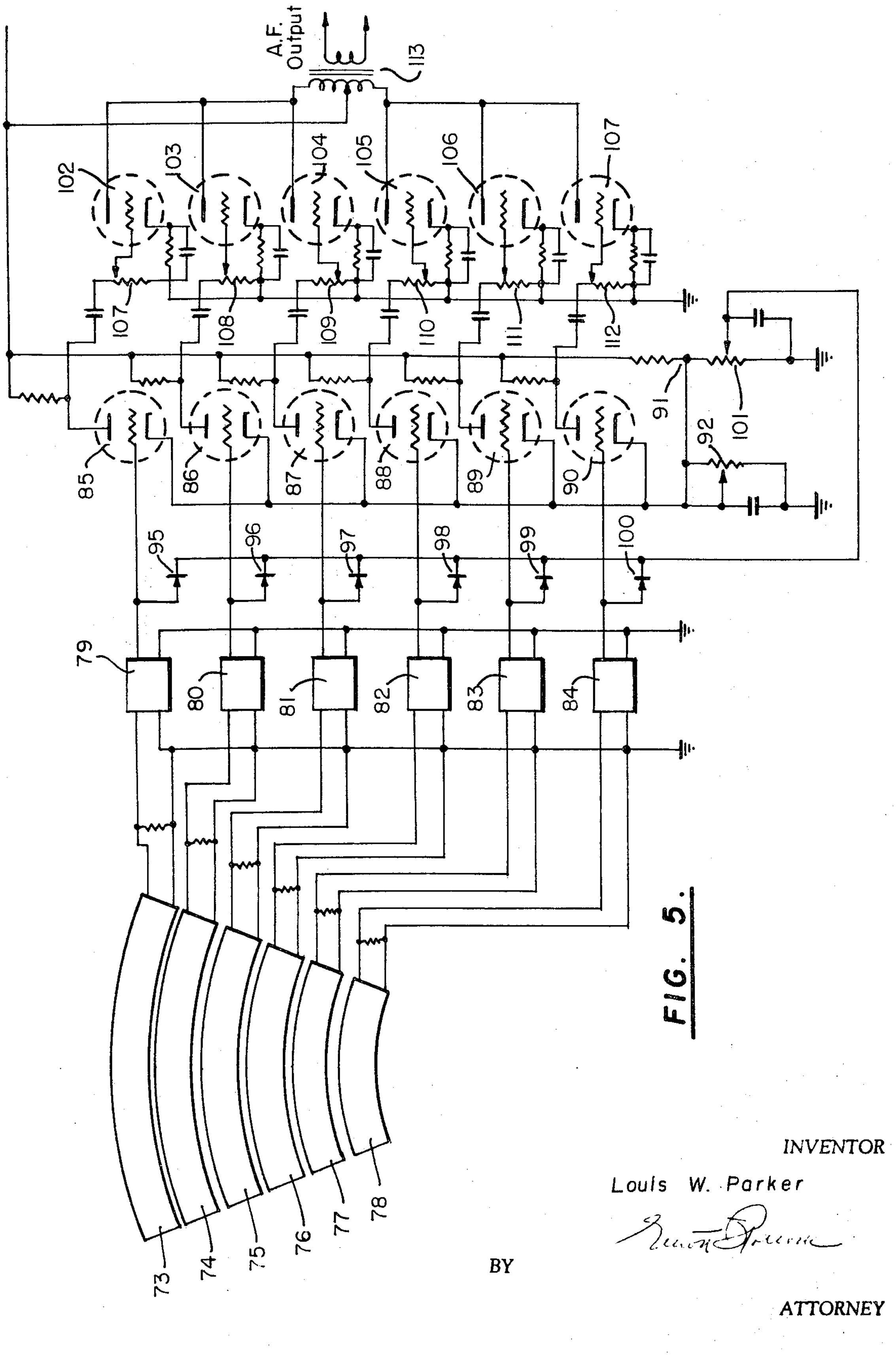
FIG. 5 is a schematic diagram of an alternative embodiment of the invention based on the distribution curve of FIG. 4.

An even greater improvement in signal to noise ratio can be achieved, even when segmental plates or photocells are employed, by adopting the alternative approaches illustrated and described in reference to FIGS. 4–6; but such improvement is accomplished at the cost of greater complexity in the equipment.

More particularly, a cursory examination of electrical noise reveals that most types of random noise, especially those which result from the summation of a great many microscopic effects, such as thermal noise and shot effect noise, have what are called Gaussian or normal statistics. A Gaussian distribution curve is illustrated at 71 in FIG. 4. The vertical axis in FIG. 4 is calibrated in arbitrary units of brilliance, while the horizontal axis represents the portion of the radial length occupied by the brilliant circular line or oscillogram on the CR tube screen. The brilliance-to-radius curve of a well focused circle-shaped oscillogram without noise is depicted at 70; and a similar plot of the brilliance-to-radius curve, when noise is present, is illustrated at 71. The addition of shot effect noise causes the plot 71 to assume the characteristics of a Gaussian curve, and the extent by which plot 71 is broadened over that of plot 70 is approximately proportional to the amount of noise which has been added. This effect is generally equivalent to that produced when the electron beam spot on the CR tube is poorly focused (i.e. the maximum brilliance of the spot, when noise is present, is less since noise causes the electron beam to move over a scattered path).

Inasmuch as the present invention utilizes voltages which are generated by photo-voltaic cells or secondary emission plates for control purposes, it is more practical to refer to the height of the curves 70 and 71 as electrical potentials measured in volts. Since the height of curve 71 is fairly constant with time, regardless of modulation, it is possible to cut off most of its lower portion. If the lower portion of curve 71 is eliminated, for example at the level designated 72, much of the noise voltage will also be cut off. While it is true that the top of the curve 71 does exhibit some variation in brilliance, much of this brilliance variation can be compensated by modulating the electron beam in the manner already described.

It is also possible to limit the height of the voltage curve 71 by electronic means (to be described) thereby reducing the "fuzz" on the top of the curve, and further reducing noise. Line **72*a* illustrates one possible result of such a limiting operation. If this procedure is carried to its limit, a nearly square-topped wave having very little noise effect will result. However, unless a large number of such square top waves are used to make up the AF voltage, considerable distortion will result. The width of the voltage wave shown in FIG. 4, above line 72**, must be sufficiently large so that when the circular oscillogram moves from one photocell to another, the change is not too abrupt. Also, more than two photocells are preferably employed so as to reduce the size of the steps.

A system embodying the principles described above is shown in FIG. 5. Six photocells 73–78 inclusive, of the photovoltaic type, are employed. However, it must be understood that any number larger or smaller than six may be utilized, with FIG. 5 only being illustrative. The cells 73–78 are ring-shaped, but segmental; and they are located in concentric relation to one another around parallel circular arcs, so that a circular oscillogam of the type already described in reference to FIG. 1 can be projected over the photocells in the manner already described. The size of the cells 73–78 decreases respectively as the cells approach the center of the concentric array, but the voltage generated by each cell nevertheless remains the same. This is due to the fact that the number of electrons reaching any arcuate width is the same regardless of the radius of the circle, and therefore the brilliance increases nearer the center of the array. If we assume for the moment that no noise is present, and that the output voltage from each photocell varies linearly with brilliance, there will be no difference between the outputs of all the photocells 73–78.

Inasmuch as the outputs of the several cells 73–78 are in the millivolt range, it is necessary to amplify them individually before these voltages can be used further. To accomplish this, amplifiers 79–84 inclusive are connected respectively to the cells 73–78 inclusive. The inputs of amplifiers 79–84 are loaded with resistances of suitable value in order to improve the frequency characteristic of the photocells, inasmuch as the photocells contain a substantial amount of internal capacity.

In order to visualize the operation of this embodiment, let us first assume that an unmodulated carrier is picked up by receiver 11 (FIGS. 1 and 2). Such a carrier, after being processed through the circuits already described in reference to FIG. 1, creates a circular oscillogram in the fashion already described. In the embodiment of FIG. 5, this circle is optically projected so as to lie partially on photocell 75, partially on photocell 76, and partially on the space between cells 75 and 76. Let us now assume that the carrier increases in amplitude to equal the value which it reaches at its peak, i.e. 100%, modulation. When this occurs, the diameter of the circular oscillogram will similarly increase so that the light projected therefrom will fall upon photocell 73. The DC potential generated by photocell 73 is amplified by amplifier 79 and is applied directly to the grid of a triode 85 in positive polarity. Triode 85 is normally biased past cut-off by resistor network 91, 92; and the application of a positive potential to its grid causes plate current to commence flowing. Tube 85 amplifies the impulse caused by this current flow, and applies it via a potentiometer 107 to tube 102, and thence to one side of push-pull transformer 113.

If the IF carrier should be decreased to a medium potential, the circular oscillogram will fall on photocell 74. The output of this photocell is treated in a fashion similar to that already described, i.e. its output is amplified by an amplifier 80 and then applied to a triode 86, the output of which is coupled via potentiometer 108 and tube 103 to one side of transformer 113. The setting on potentiometer 108 differs from that of potentiometer 107, however, so that only about ⅔ of the output from tube 86 is applied to tube 103. In similar fashion, the output of photocell 75 is coupled via amplifier 81, triode 87, potentiometer 109, and tube 104 to one side of transformer 113; and, in this case, potentiometer 109 is so set that only about one-third of the amplified output from tube 87 is applied to tube 104. The plates of triodes 102, 103, and 104 are, as illustrated, connected together and to one side of push-pull transformer 113.

When the circular oscillogram decreases in amplitude below the original carrier condition, due to modulation in the opposite direction, effects similar to those already described take place, but this time in relation to photocells 76, 77 and 78. The output of these three photocells are connected via amplifiers 82, 83 and 84 to triodes 88, 89, and 90 respectively; and the outputs of said triodes 88–90 are coupled respectively via potentiometers 110, 111 and 112 (differently set from one another, in the manner already described) to tubes 105, 106, and 107 and then, together, to the opposite side of push-pull transformer 113. The signals applied to the lower end of transformer 113 thus represent the opposite polarity of the demodulated signal.

By reason of the considerations described the various amplitudes of the AF wave are converted, by the photocell array, into separate voltage pulses of the same amplitude, and these separated voltage pulses are caused to assume varying positions on a two dimensional area. The separate pulses representing the various amplitudes of the original AF wave have their amplitudes reduced in accordance with the position of the circular oscillogram on the two-dimensional area, and the resultant pulses are then combined in an output circuit to reconstruct an AF wave, substantially similar to the wave form originally transmitted, from the various voltage and time duration pulses. A demodulated quarter sine wave is produced which is made up of three areas, i.e. areas of one-third amplitude, two-thirds amplitude, and full amplitude respectively; and the other three-quarters of the sine wave contain the same areas, but in different order.

The approximate shape of the resultant sine wave, produced by the various outputs of the photocells 73–78, is illustrated in FIG. 6; and, as there depicted, the sine wave includes several "bumps" on its surface. The number of "bumps" is dependent upon the number of photocells employed, and such bumps become less pronounced when the number of photocells is increased. When six photocells are employed (the embodiment depicted in FIG. 5), there will be twelve bumps on the sine wave; and, for this reason, the output will contain a strong twelfth harmonic. Inasmuch as good understandability of speech may be obtained in the comparatively narrow frequency range of 400 to 3500 Hz., however, the twelfth harmonic can be filtered out.

In the arrangement shown in FIG. 5, the size of the spot forming the circular oscillogram is preferably made comparatively large as a result of intentional defocusing of the spot and the effects of noise; and this assures that the steps from one level to the next are not excessively sharp. The focusing adjustment of the cathode ray tube can be varied while listening to speech reception until a best compromise is achieved between understandability and noise.

In the arrangement of FIG. 5 diodes 95–100 are depicted at the outputs of the several amplifiers 79–84 respectively. These diodes are optional and, if employed, operate to limit the amplitude of the voltages derived from amplifiers 79–84 by passing current and loading the amplifiers when the amplifier output potentials rise above an arbitrary value set by potentiometer 101. When this type of arrangement is employed, it achieves an additional reduction in noise, but at the expense of a slight reduction in quality. Potentiometer 101 is adjusted, again while listening to speech output, until best underestandability is achieved.

While I have thus described preferred embodiments of the present invention, many variations will be suggested to those skilled in the art. By way of example, while the systems have been described in reference to radio receivers, the secondary emission plate embodiments of the invention (e.g. FIG. 3) are fast enough in operation to permit the invention to be employed for the demodulation of television signals. It must therefore be understood that the foregoing description is intended to be illustrative only and not limitative of the invention; and all such variations and modifications as are in accord with the principles described are meant to fall within the scope of the appended claims.

Having thus described my invention, I claim:

1. An amplitude modulation detector comprising a radio receiver operative to receive a transmitted signal and to convert the received signal into an IF signal, a cathode ray tube having beam deflection means, control means responsive to said IF signal for controlling said beam deflection means to produce a circular oscillogram having a diameter related to the amplitude of said IF signal, a pair of ring-shaped plates disposed in facing relation to the screen of said cathode ray tube in spaced concentric relation to one another, said plates being so positioned that, when said oscillogram has a diameter corresponding to the generation of an unmodulated IF carrier signal in said receiver, said oscillogram is disposed opposite the gap between said ring-shaped plates as well as in partially overlapping relation to each of said plates, said control means being operative to shift the position of said oscillogram relative to said plates and relative to the gap therebetween by varying the diameter of said oscillogram in proportion to the amount of amplitude modulation present on said IF carrier, signal generating means coupled respectively to said pair of plates for producing first and second signals having magnitudes dependent respectively on the amounts by which said oscillogram overlaps said pair of plates, and means for combining said first and second signals to produce a composite demodulated audio frequency output signal.

2. The combination of claim 1 wherein said pair of plates comprise a pair of ring-shaped photocells located externally of the enevlope of said cathode ray tube in facing relation to the screen of said cathode ray tube, and optical means disposed between said pair of photocells and said cathode ray tube screen for projecting light from said oscillogram onto said photocells.

3. The combination of claim 2 wherein said photocells are of the photo-volatic type.

4. The combination of claim 2 wherein said photocells are of variable-resistance type.

5. The combination of claim 2 including masks located adjacent the screen of said cathode ray tube for preventing the projection of light to said photocells from areas of said tube screen located beyond the maximum excursions of said oscillogram.

6. The combination of claim 2 wherein said pair of ring-shaped photocells each extend over an arc comprising only a portion of a circle.

7. The combination of claim 1 wherein said pair of plates comprise a pair of ring-shaped secondary emission plates located within the envelope of said cathode ray tube closely adjacent to the screen of said tube.

8. The combination of claim 1 wherein said last-named means adds said first and second signals algebraically.

9. The combination of claim 1 wherein the widths of said ring-shaped plates, in radial directions relative to said circular oscillogram, extend only to those locations corresponding to the oscillogram diameters produced when said IF carrier is modulated to a perselected peak amplitude on both the positive and negative halves of the audio frequency cycle, whereby said plates operate to clip any noise signals riding on said oscillogram and extending beyond said peak amplitude of modulation.

10. The combination of claim 1 including light-sensitive means located adjacent the screen of said cathode ray tube for monitoring the brilliance of said oscillogram, and means responsive to said light-sensitive means for maintaining the brilliance of said oscillogram at a nearly steady level.

11. The combination of claim 1 including a variable gain amplifier responsive to said composite output signal for applying a feedback control signal to said cathode ray tube operative to reduce variations in the diameter of said oscillogram.

12. The combination of claim 1 including a local oscillator connected to add a signal to said IF signal and operative to reduce the percentage of modulation present in the signal to which said control means is responsive.

13. The combination of claim 1 wherein said pair of ring-shaped plates comprise a plurality of such plates, having a number in excess of two, disposed in a concentric array, means for producing substantially the same output potential from each of said plates when said oscillogram overlaps said plate, variations in amplitude of said IF signal causing said oscillogram to shift in position from one to the next of said plurality of plates whereby variations in amplitude of said IF signal are converted into a series of uniform amplitude output pulses, said combining means including means for combining said series of pulses in varying time relation to one another.

14. The combination of claim 13 including means for varying the amplitude of individual ones of said pulses to cause said pulses to have different relative amplitudes to their being combined by said combining means.

15. The combination of claim 13 including means for clipping portions of said pulses, to eliminate part of any noise signals riding on said pulses, prior to the combining of said pulses by said combining means.

References Cited

UNITED STATES PATENTS 2,903,582 9/1959 Horgan ............ 329—155

ALBERT J. MAYER, Examiner

U.S. Cl. X.R.

325—473; 329—155